United States Patent
Gu et al.

(10) Patent No.: US 12,260,524 B2
(45) Date of Patent: Mar. 25, 2025

(54) IMAGE PROCESSING METHOD AND STORAGE MEDIUM

(71) Applicant: Beijing Xiaomi Mobile Software Co., Ltd., Beijing (CN)

(72) Inventors: Zhongzheng Gu, Beijing (CN); Ce Guo, Beijing (CN); Yao Gong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 479 days.

(21) Appl. No.: 17/565,753

(22) Filed: Dec. 30, 2021

(65) Prior Publication Data

US 2022/0375037 A1    Nov. 24, 2022

(30) Foreign Application Priority Data

May 18, 2021 (CN) .......................... 202110540203.X

(51) Int. Cl.
| | |
|---|---|
| *G06T 5/00* | (2024.01) |
| *G06T 5/10* | (2006.01) |
| *G06T 5/50* | (2006.01) |
| *G06T 5/70* | (2024.01) |
| *H04N 9/67* | (2023.01) |

(52) U.S. Cl.
CPC ................. *G06T 5/70* (2024.01); *G06T 5/10* (2013.01); *G06T 5/50* (2013.01); *H04N 9/67* (2013.01); *G06T 2207/10024* (2013.01); *G06T 2207/20052* (2013.01); *G06T 2207/20221* (2013.01)

(58) Field of Classification Search
CPC .... G06T 5/70; G06T 5/10; G06T 5/50; G06T 2207/10024; G06T 2207/20052; G06T 2207/20221; G06T 5/20; G06T 7/90; H04N 9/67
See application file for complete search history.

(56) References Cited

U.S. PATENT DOCUMENTS

| | | | |
|---|---|---|---|
| 2009/0285480 A1* | 11/2009 | Bennett ...................... | G06T 5/70 |
| | | | 382/167 |
| 2012/0224784 A1* | 9/2012 | Cohen ....................... | G06T 5/70 |
| | | | 382/260 |

OTHER PUBLICATIONS

Guoshen Yu et al., DCT Image Denoising: a Simple and Effective Image Denoising Algorithm, pub. 2011. (Year: 2011).*

Guoshen Yu et al., ( hereafter Guoshen), DCT Image Denoising: a Simple and Effective Image Denoising Algorithm, pub. 2011. (Year: 2011).*

(Continued)

*Primary Examiner* — Mekonen T Bekele

(74) *Attorney, Agent, or Firm* — Volpe Koenig

(57) ABSTRACT

An image processing method includes converting an original image represented by a first color space into the original image represented by a second color space, where a correlation between color components of respective channels in the second color space of the original image is smaller than a correlation between color components of respective channels in the first color space; denoising channel images formed by the color components of the respective channels in the second color space respectively to obtain denoised images corresponding to the respective channel images; and obtaining a target image based on the denoised images.

17 Claims, 3 Drawing Sheets

(56) References Cited

OTHER PUBLICATIONS

Guoshen Yu et al: "DCT image denoising: a simple and effective image denoising algorithm", Image Processing on Line, vol. 1, Oct. 24, 2011, XP055551468, DOI: 10.5201/ipol.2011.ys-dct, p. 292-p. 295.
Nai-Xiong Lian et al: "Image Denoising Using Optimal Color Space Projection", Acoustics, Speech and Signal Processing, 2006. ICASSP 2006 Proceedings. 2006 IEEE International Conference on Toulouse, France May 14-19, 2006 , Piscataway, NJ, USA, IEEE, Piscataway, NJ, USA, 2006 , pp. II-93-II-96, XP 031100547, DOI: 10.1109/ICASSP.2006.1660287, ISBN: 978-1-4244-0469-8, pp. II-93-pp. II-95.
Extended European Search Report dated Jul. 8, 2022 for European Patent Application No. 21218062.4.

* cited by examiner

IMAGE PROCESSING METHOD AND STORAGE MEDIUM

CROSS REFERENCE TO RELATED APPLICATIONS

The disclosure is based on and claims priority to Chinese Patent Application No. 202110540203.X filed on May 18, 2021, which is herein incorporated by reference in its entirety.

BACKGROUND

In related art, in order to improve the quality of a collected image, after the image is collected, it is necessary to carry out denoising on the collected image. As the image processing techniques play an increasingly important role in the fields of artificial intelligence (AI) recognition, fingerprint detection, automatic driving, etc., the influence of denoising algorithms is increasing day by day.

SUMMARY

According to a first aspect of examples of the disclosure, provided is an image processing method, including:
converting an original image represented by a first color space into the original image represented by a second color space, where a correlation between color components of channels in the second color space of the original image is smaller than a correlation between color components of channels in the first color space; and
denoising channel images formed by the color components of the respective channels in the second color space respectively to obtain denoised images corresponding to the respective channel images; and
obtaining a target image based on the denoised images.

According to a second aspect of examples of the disclosure, provided is an image processing apparatus, including:
a processor; and
a memory storing executable instructions of the processor.

The processor is configured to implement the steps in any image processing method in the above first aspect during execution.

According to a third aspect of examples of the disclosure, provided is a non-transitory computer-readable storage medium. When instructions in the storage medium are executed by a processor of an image processing apparatus, the apparatus is capable of executing any image processing method in the above first aspect.

Understandably, the above general description and the following detailed description are only exemplary and explanatory and do not limit the disclosure.

BRIEF DESCRIPTION OF THE DRAWINGS

The accompanying drawings are incorporated into the specification and constitute a part of the specification to show examples that comply with the disclosure, and are used together with the specification to explain the principles of the disclosure.

DETAILED DESCRIPTION

Figure 1:
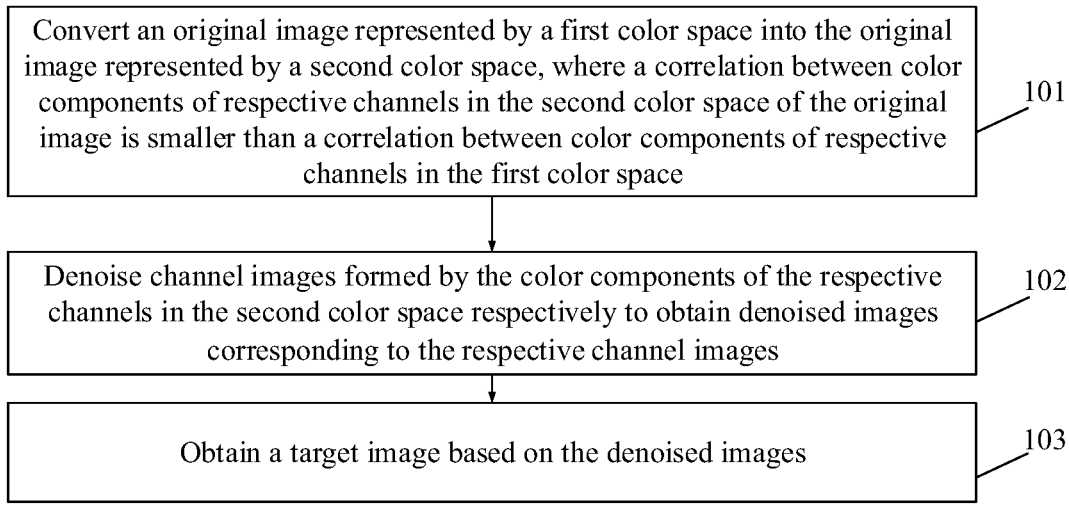
FIG. 1 is a flow chart of an image processing method shown according to an example.

Some examples will be described in detail here, and examples are shown in the drawings. When the following description involves the drawings, unless otherwise indicated, the same numeral in different drawings indicates the same or similar elements. The implementation modes described in the following examples do not represent all implementation modes consistent with the disclosure. On the contrary, they are merely examples of apparatuses and methods consistent with some aspects of the disclosure as described in detail herein and in the appended claims.

In related art, channels of a collected image have a large correlation in an original color space and most of current denoising methods are limited to a fixed color space, so that only a color component corresponding to one channel can be subjected to denoising at a time. For example, only one of a luminance component or a color component can be denoised, so that the obtained image has poor quality.

An example according to the disclosure herein provides an image processing method. FIG. 1 is a flow chart of an image processing method shown according to an example. As shown in FIG. 1, the method includes the following steps:

In step 101, converting an original image represented by a first color space into the original image represented by a second color space, where a correlation between color components of respective channels in the second color space of the original image is smaller than a correlation between color components of respective channels in the first color space.

In step 102, denoising channel images formed by the color components of the respective channels in the second color space respectively to obtain denoised images corresponding to the respective channel images; and in step 103, obtaining a target image based on the denoised images.

The image processing method according to an example of the disclosure may be applied to an electronic device. Here, the electronic device includes a mobile terminal and a fixed terminal. The mobile terminal includes a mobile phone, a tablet computer, a notebook computer, etc. The fixed terminal includes a personal computer. In other optional examples, the image processing method may also run on a network-side device. The network-side device includes a server, a processing center, etc. Certainly, the electronic device may also be a camera that can be used alone, or a camera that can be embedded in a terminal device.

In an example of the disclosure, the original image may be an image collected by an image collection module of the electronic device, or an image pre-stored on the electronic device, or an image acquired by the electronic device from other devices, which are not specifically enumerated here. In some examples, the original image may be an image with noise represented by the first color space.

In an example of the disclosure, after the original image with noise is acquired, the original image represented by the first color space may be converted into the original image represented by the second color space.

Here, the first color space may include: an RGB color space. R represents a red channel, G represents a green channel, and B represents a blue channel. The second color space may include an Lαβ color space. L represents a luminance component, α and β represent two chroma components, α represents a yellow-blue opponent channel, and β represents a red-green opponent channel. Certainly, in other examples, the first color space may further include an LMS color space. L represents a first main component, M represents a second main component, and S represents a third main component. In another example, the first color space may include an HSV color space. H represents hue, S represents saturation, and V represents value. As long as the correlation between the color components of the respective channels in the second color space is smaller than the correlation between the color components of the respective channels in the first color space, there is no further specific limitation here.

In an example of the disclosure, after the original image represented by the first color space is converted into the original image represented by the second color space, the channel images formed by the color components of the respective channels in the second color space can be denoised respectively to obtain the denoised images corresponding to the respective channel images.

Taking the second color space being the Lαβ color space as an example, the second color space has a first channel, a second channel and a third channel. In an implementation process, color components in the first channel, the second channel and the third channel can be denoised respectively, so that three denoised images can be obtained.

In some other examples, taking the first color space being the RGB color space and the second color space being the Lαβ color space as an example, in an implementation process, the original image can be converted from the RGB color space to the LMS color space, and then converted from the LMS color space to the Lαβ color space.

A formula for conversion from the RGB color space to the LMS color space is as follows:

$$\begin{bmatrix} L \\ M \\ S \end{bmatrix} = \begin{bmatrix} 0.3811 & 0.5783 & 0.0402 \\ 0.1967 & 0.7244 & 0.0782 \\ 0.0241 & 0.1288 & 0.8444 \end{bmatrix} \begin{bmatrix} R \\ G \\ B \end{bmatrix} \quad (1)$$

In formula (1), L, M and S represent values of the LMS color space; and R, G and B represent values of the RGB color space.

A formula for conversion from the LMS color space to the Lαβ color space is as follows:

$$\begin{bmatrix} L \\ \alpha \\ \beta \end{bmatrix} = \begin{bmatrix} \frac{1}{\sqrt{3}} & 0 & 0 \\ 0 & \frac{1}{\sqrt{6}} & 0 \\ 0 & 0 & \frac{1}{\sqrt{2}} \end{bmatrix} \begin{bmatrix} 1 & 1 & 1 \\ 1 & 1 & -2 \\ 1 & -1 & 0 \end{bmatrix} \begin{bmatrix} \log(L) \\ \log(M) \\ \log(S) \end{bmatrix} \quad (2)$$

In formula (2), L, M and S represent values of the LMS color space, and L, α and β represent values of the Lαβ color space. Here, the logarithms of the color components of the channels in the LMS color space are found respectively in order to converge data and make color distribution more in line with the perception of human eyes.

Here, based on the orthogonality of the color space, the three channels of the color image (original image) can be separated, and the color image can be converted to the LMS color space, and then converted to the Lαβ color space by orthogonalization and decorrelation. Then, the L, α and β channels are subjected to denoising respectively after domain conversion, and the target image in the Lαβ color space is converted into a required color space format, so that the denoised color image can be obtained. The denoising after domain conversion is as follows: the original image is converted from a spatial domain to a spectral domain by discrete cosine transform, adaptive Gaussian smoothing is carried out on the image converted to the spectral domain, and then inverse discrete cosine transform is carried out on the image subjected to Gaussian smoothing to obtain the denoised image. In an example of the disclosure, noise can be separated more effectively by using the adaptive Gaussian smoothing operation.

In the examples of the disclosure, the original image may be converted from the first color space to the second color space. Since the correlation between the color components of the respective channels in the second color space of the original image is smaller than the correlation between the color components of the respective channels in the first color space, by utilizing the conversion between the color spaces, the correlation between the color components of the respective channels corresponding to the original image can be weakened, so that the channel images formed by the color components of the respective channels can be denoised respectively, and the denoising of the color components of different channels at the same time can be realized. The operation is convenient, and denoising effect can be improved, such that quality of the finally obtained target image can be ensured.

In some other examples, after the target image is obtained, since the target image is represented by the second color space, in the implementation process, the target image represented by the second color space can be converted into the target image represented by a target color space. Taking the second color space being the Lαβ color space and the target color space being the RGB color space as an example, the target image can be converted from the Lαβ color space to the LMS color space, and then converted from the LMS color space to the RGB color space.

A formula of conversion from the Lαβ color space to the LMS color space is as follows:

$$\begin{bmatrix} L \\ M \\ S \end{bmatrix} = \begin{bmatrix} 1 & 1 & 1 \\ 1 & 1 & -1 \\ 1 & -2 & 0 \end{bmatrix} \begin{bmatrix} \frac{1}{\sqrt{3}} & 0 & 0 \\ 0 & \frac{1}{\sqrt{6}} & 0 \\ 0 & 0 & \frac{1}{\sqrt{2}} \end{bmatrix} \begin{bmatrix} L \\ \alpha \\ \beta \end{bmatrix} \quad (3)$$

In formula (3), L, M and S represent values of the LMS color space; and L, α and β represent values of the Lαβ color space.

A formula of conversion from the LMS color space to the RGB color space is as follows:

$$\begin{bmatrix} R \\ G \\ B \end{bmatrix} = \begin{bmatrix} 4.4679 & -3.5873 & 0.1193 \\ -1.2186 & 2.3809 & -0.1624 \\ 0.0497 & -0.2439 & 1.2045 \end{bmatrix} \begin{bmatrix} 10^L \\ 10^M \\ 10^S \end{bmatrix} \quad (4)$$

In formula (4), L, M and S represent values of the LMS color space; and R, G and B represent values of the RGB color space.

In some other examples, the target color space may include: the LMS color space, the HSV color space and similar examples which are not specifically enumerated here.

In some examples, denoising the channel images formed by the color components of the respective channels in the second color space respectively to obtain the denoised images corresponding to the respective channel images includes:

converting the channel images from a spatial domain to a spectral domain respectively; and denoising the channel images converted to the spectral domain respectively to obtain the denoised images corresponding to the respective channel images.

In some examples, converting the channel images from the spatial domain to the spectral domain respectively includes:

carrying out a discrete cosine transform on the channel images respectively to convert the respective channel images from the spatial domain to the spectral domain.

For example, after the original image is converted to the second color space, a discrete cosine transform can be carried out on the color components of the respective channels in the second color space so that the channel images formed by the color components of the respective channels can be converted from the spatial domain to the spectral domain, and Gaussian smoothing can be carried out on the channel images in the spectral domain respectively. After the Gaussian smoothing, an inverse discrete cosine transform is carried out on the channel images subjected to Gaussian smoothing to obtain the denoised images corresponding to the respective channel images.

Here, after the channel images are converted from the spatial domain to the spectral domain, a low-frequency part, an intermediate-frequency part and a high-frequency part in the respective channel images are distributed in a set order from an upper left corner to a lower right corner of the respective channel images. Adaptive Gaussian smoothing can be carried out on the respective channel images in the spectral domain, which is equivalent to carrying out different threshold limited filtrations on different spatial frequencies, for example, an adaptive threshold can be set for the high-frequency part. After Gaussian smoothing is carried out on the respective channel images, an inverse discrete cosine transform is carried out on the channel images subjected to Gaussian smoothing to obtain the denoised images corresponding to the respective channel images.

Taking a single-channel image converted to the second color space (for example, the $L\alpha\beta$ color space) being $O(r,\theta)$ as an example, the distribution of the spectral domain after the adaptive Gaussian smoothing is:

$$T(\rho,\varphi)D[O(r,\theta)]*\text{Gauss}(r-r_0,\theta) \quad (5)$$

In formula (5), $T(\rho, \varphi)$ represents distribution of the spectral domain of the single-channel image subjected to adaptive Gaussian smoothing; $\rho$ and $\varphi$ represent base coordinates in the spectral domain; $O(r,\theta)$ represents the single-channel image, and r and $\theta$ represent base coordinates in the spatial domain; D[ ] represents a discrete cosine transform function; Gauss $(r-r_0,\theta)$ represents a function whose value varies with radius by taking the upper left corner of the single-channel image as the center of a circle; and $r_0$ represents a distance of variation of the center of the circle, that is, a distance from the upper left corner to the center of the image.

The single-channel image may be any channel image in the second color space. Taking the second color space being the $L\alpha\beta$ color space as an example, the single-channel image may be any of an L channel image, a $\alpha$ channel image and a $\beta$ channel image.

A denoised single-channel image is:

$$O'(r,\theta)=D^{-1}[T(\rho,\varphi)] \quad (6)$$

In formula (6), $O'(r,\theta)$ represents the denoised single-channel image; $T(\rho, \varphi)$ represents distribution of the spectral domain of the single-channel image subjected to adaptive Gaussian smoothing; and $D^{-1}[\ ]$ represents an inverse discrete cosine transform function.

In the example of the disclosure, after the respective channel images are converted from the spatial domain to the spectral domain, the channel images converted to the spectral domain are denoised respectively. Based on denoising after domain conversion, the discrete cosine transform and the Gaussian smoothing of the spectral domain are used to denoise the channel images respectively, so that a good denoising effect can be realized.

In some examples, obtaining the target image based on the denoised images includes:

fusing a first channel image in all the channel images and in a first denoised image corresponding to the first channel image to obtain a composite image; and obtaining the target image based on the composite image and a second denoised image corresponding to a second channel image other than the first channel image.

In an example of the disclosure, after the first channel image is denoised, the first channel image and the first denoised image corresponding to the first channel image can be fused to obtain the composite image. Taking the second color space being the $L\alpha\beta$ color space as an example, the first channel image may be the L channel image; and the second channel image may include the $\alpha$ channel image and the $\beta$ channel image. That is, in an implementation process, the original L channel image and the denoised image of the L channel image can be fused to obtain the composite image.

In an example of the disclosure, a fusing process may be as follows: color components for forming the composite image are obtained by means of summing and averaging the respective color components in the first channel image and the respective color components in the first denoised image, so that the composite image is obtained. In other optional examples, the first channel image and the first denoised image may also be fused according to other manners which are not specifically enumerated here.

After the composite image is obtained, the target image may be obtained based on the composite image and the second denoised image corresponding to the second channel image other than the first channel image. For example, the color components of the composite image and the color components of the second denoised image may be used as the color components of the respective channels of the target image respectively.

Still taking the second color space being the $L\alpha\beta$ color space as an example, the color components of the composite image may be determined as the color components of the L channel, the color components of the first denoised image may be determined as the color components of the $\alpha$ channel, and the color components of the second denoised image may be determined as the color components of the $\beta$ channel.

In an example of the disclosure, after the first channel image and the first denoised image are fused to obtain the composite image, the target image is obtained based on the composite image and the second denoised image corresponding to the second channel image other than the first channel image, so that the obtained target image is more natural and more in line with the perception of human eyes.

In some other examples, a number of the first channel images may be at least one, a number of the second channel images may also be at least one, and here, the number of the first channel images may be the same or different than the number of the second channel images. For example, the number of the first channel images may be one, and the number of the second channel images may be two. For another example, the number of the first channel images may be two, and the number of the second channel images may be one. For still another example, the number of the first channel images and the number of the second channel images are both one; and there are other examples, each and every one of which will not be illustrated here.

In some other examples, after the composite image is obtained, image quality parameters of the composite image may be determined, and whether the image quality parameters are greater than preset standard quality parameters may be determined. When the image quality parameters of the composite image are greater than the standard quality parameters, the target image is obtained based on the composite image and the second denoised image corresponding to the second channel image other than the first channel image. In that manner, the quality of the finally obtained target image can be ensured.

In some examples, the image quality parameters may include: image luminance, image saturation, image color, or other parameters, which are not specifically enumerated here. The standard quality parameters may be set according to needs, for example, may be set according to empirical values, or may also be set according to historical image parameters, or furthermore, may further be set according to user needs, which are not specifically enumerated here.

In some examples, fusing the first channel image of all the channel images and the first denoised image corresponding to the first channel image to obtain the composite image includes:
- weighting color components corresponding to the first channel image and color components corresponding to the first denoised image based on composition weights to obtain a weighted color component; and
- fusing based on the weighted color component to form the composite image.

In an example of the disclosure, the first channel image and the first denoised image may be weighted based on the composition weights to obtain the weighted color component, and the composite image is formed based on the weighted color component.

Here, the original image of the first channel (first channel image) and the denoised image (first denoised image) may be combined first to obtain the composite image, and the proportions of the first channel image and the first denoised image in the composite image may be controlled by setting the composition weights, so that image details can be preserved on the basis of denoising of the composite image, such that a high-quality composite image is obtained.

In some examples, weighting the color components corresponding to the first channel image and the color components corresponding to the first denoised image based on the composition weights to obtain the weighted color component includes:
- weighting the color components of the respective channels of the first channel image based on a first composition weight to obtain a first weighted component;
- weighting the color components of the respective channels corresponding to the first denoised image based on a second composition weight to obtain a second weighted component; and
- determining a sum of the first weighted component and the second weighted component as the weighted color component.

Here, the first composition weight and the second composition weight may be preset, or may alternatively be determined according to current image parameters of the first channel image and the second denoised image. For example, the current image parameters of the first channel image and the second denoised image may be acquired, and then input into a pre-trained parameter determination model to obtain corresponding first composition weight and second composition weight. The parameter determination model may be obtained by training based on a neural network model. Certainly, in other examples, the first composition weight and the second composition weight may be customized, or the first composition weight and the second composition weight may alternatively be determined according to historical empirical values. Here, each and every one of all possible manners for determining the first composition weight and the second composition weight will not be enumerated.

In some other examples, the composite image may be expressed as:

$$O''(r,\theta)=a*O(r,\theta)+b*O'(r,\theta) \qquad (7)$$

In formula (7), $O''(r,\theta)$ represents the composite image; a represents the first composition weight; $O(r,\theta)$ represents the first channel image; b represents the second composition weight; and $O'(r,\theta)$ represents the first denoised image.

Still taking the second color space being the $L\alpha\beta$ color space as an instance in an example of the disclosure, the original image of the first channel (first channel image) and the denoised image (first denoised image) may be combined first to obtain the composite image, and the proportions of the first channel image and the first denoised image may be controlled by setting coefficients (the first composition weight and the second composition weight) so that image details can be preserved on the basis of denoising of the composite image, such that a high-quality composite image is obtained.

In some other examples, the type of the first channel image may be different from the type of the second channel image. For example, the color components corresponding to the first channel image are used to represent the luminance of the original image, and the color components corresponding to the second channel image are used to represent the color of the original image. For another example, the color components corresponding to the first channel image are used to represent the color of the original image, and the color components corresponding to the second channel image are used to represent the luminance of the original image.

In some other examples, the type of the first channel image may be the same as the type of the second channel image. For example, the color components corresponding to the first channel image and the second channel image are both used to represent the luminance of the original image. Alternatively, the color components corresponding to the first channel image and the second channel image are both used to represent the color of the original image.

In some examples, the color components corresponding to the first channel image are used to represent the luminance of the original image. The color components corresponding to the second channel image are used to represent the color of the original image.

In the disclosure, since the color components corresponding to the first channel image are used to represent the luminance of the original image and the color components corresponding to the second channel image are used to represent the color of the original image, by denoising different channel images at the same time respectively, the luminance noise and the color noise can be reduced at the same time. Compared with past denoising methods of cameras based on camera image signal processing (ISP), the image processing method described herein adds a manner for reducing color noise, and the denoising effect is optimized and regulated by using Gaussian smoothing filtration.

Figure 2:
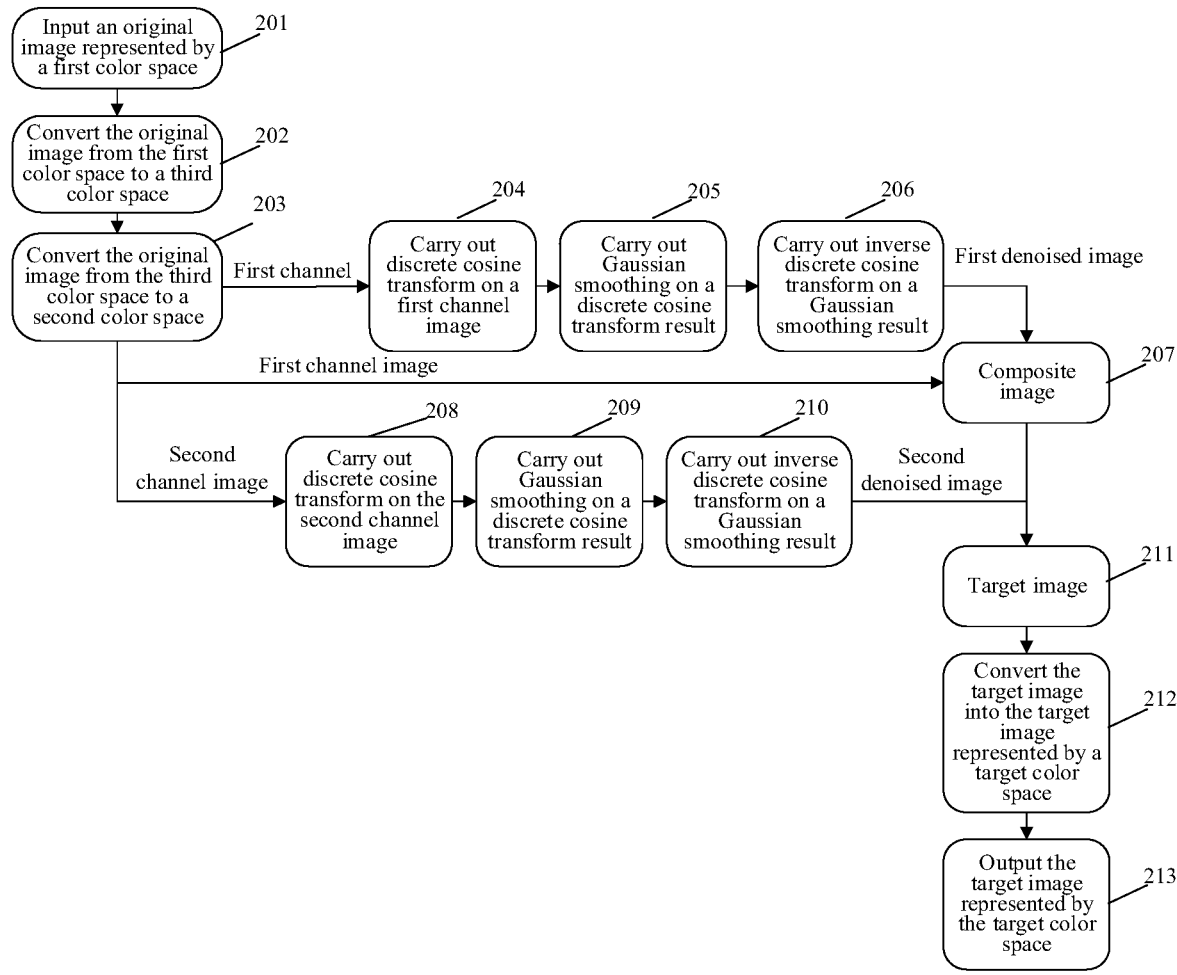
FIG. 2 is a flow chart of another image processing method shown according to an example.

FIG. 2 is a flow chart of another image processing method shown according to an example. As shown in FIG. 2, the method includes the following steps:

In step 201, an original image represented by a first color space is input.

In step 202, the original image is converted from the first color space to a third color space.

In step 203, the original image is converted from the third color space to a second color space.

Taking the first color space being the RGB color space, the second color space being the Lαβ color space and the third color space being the LMS color space as an example, in an implementation process, the original image can be converted from the RGB color space to the LMS color space, and then converted from the LMS color space to the Lαβ color space.

In step 204, a discrete cosine transform is carried out on a first channel image.

Here, taking the second color space being the Lαβ color space as an example, the first channel image may be the L channel image.

In step 205, Gaussian smoothing is carried out on a discrete cosine transform result corresponding to the first channel image.

In step 206, an inverse discrete cosine transform is carried out on a Gaussian smoothing result corresponding to the first channel image to obtain a first denoised image.

In step 207, the first channel image and the first denoised image are fused to obtain a composite image.

In step 208, a discrete cosine transform is carried out on a second channel image other than the first channel image.

Here, taking the second color space being the Lαβ color space as an example, the first channel image may include the L channel image, and the second channel image may include the α channel image and the β channel image. In some other examples, the first channel image may include the α channel image and the second channel image may include the L channel image and the β channel image. In some other examples, the first channel image may include the α channel image and the β channel image, and the second channel image may include the L channel image. The types of the first channel image and the second channel image may be set according to various needs and each and every need will not be illustrated herein.

In step 209, Gaussian smoothing is carried out on a discrete cosine transform result corresponding to the second channel image.

In step 210, an inverse discrete cosine transform is carried out on a Gaussian smoothing result corresponding to the second channel image to obtain a second denoised image.

In step 211, a target image represented by the second color space is obtained based on the composite image and the second denoised image.

In step 212, the target image represented by the second color space is converted into the target image represented by a target color space.

In step 213, the target image represented by the target color space is output.

In an example of the disclosure, the respective channels are subjected to decorrelation by utilizing the orthogonality of the color spaces, so that the correlation between the respective channels of the image is greatly reduced, which is beneficial to the denoising effect. The original image is converted from the spatial domain to the spectral domain by a discrete cosine transform, adaptive Gaussian smoothing is carried out on the image converted to the spectral domain, and then an inverse discrete cosine transform is carried out on the image subjected to Gaussian smoothing to obtain the denoised image, so that a good denoising effect can be realized. By denoising different channel images at the same time respectively, the luminance noise and the color noise can be reduced at the same time. Compared with the past denoising method of cameras based on camera ISP, the image processing method herein adds a manner for reducing color noise, and the denoising effect can be optimized by using Gaussian smoothing filtration.

Figure 3:
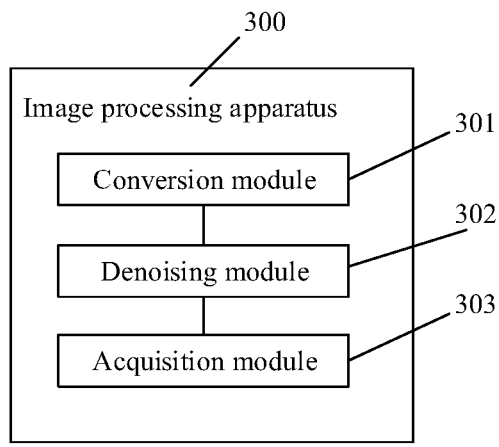
FIG. 3 is a block diagram of an image processing apparatus shown according to an example.

FIG. 3 is a block diagram of an image processing apparatus shown according to an example. As shown in FIG. 3, the apparatus 300 comprises:

a conversion module 301, configured to convert an original image represented by a first color space into the original image represented by a second color space, where a correlation between color components of respective channels in the second color space of the original image is smaller than a correlation between color components of respective channels in the first color space;

a denoising module 302, configured to denoise channel images formed by the color components of the respective channels in the second color space respectively to obtain denoised images corresponding to the respective channel images; and an acquisition module 303, configured to obtain a target image based on the denoised images.

In some examples, the acquisition module 303 is configured to:
fuse a first channel image in all the channel images and a first denoised image corresponding to the first channel image to obtain a composite image; and
obtain the target image based on the composite image and a second denoised image corresponding to a second channel image other than the first channel image.

In some examples, the acquisition module 303 is configured to:
weight color components corresponding to the first channel image and color components corresponding to the first denoised image based on composition weights to obtain a weighted color component; and
carry out fusing based on the weighted color component to form the composite image.

In some examples, the acquisition module 303 is configured to:
weight the color components of the respective channels corresponding to the first channel image based on a first composition weight to obtain a first weighted component;

weight the color components of the respective channels corresponding to the first denoised image based on a second composition weight to obtain a second weighted component;

and determine a sum of the first weighted component and the second weighted component as the weighted color component.

In some examples, the denoising module 302 is configured to:

convert the channel images from a spatial domain to a spectral domain respectively; and denoise the channel images converted to the spectral domain respectively to obtain the denoised images corresponding to the respective channel images.

In some examples, the denoising module is configured to:

carry out a discrete cosine transform on the channel images respectively to convert the respective channel images from the spatial domain to the spectral domain.

In some examples, the color components corresponding to the first channel image are used to represent the luminance of the original image. The color components corresponding to the second channel image are used to represent the color of the original image.

For the apparatus in the above examples, the specific manner in which each module executes the operation has been described in detail in the examples related to the method, and that detailed description will not be repeated here.

Figure 4:
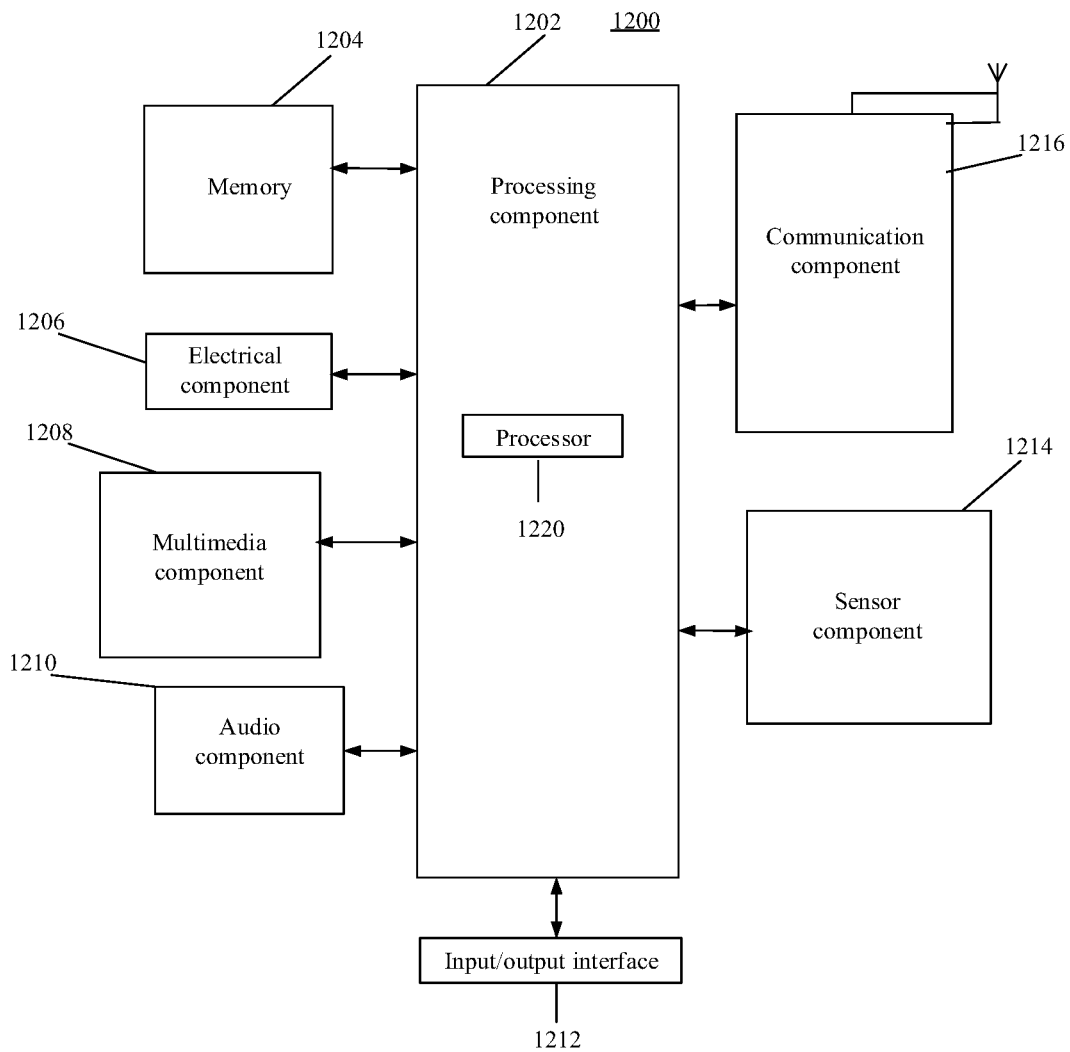
FIG. 4 is a block diagram of an apparatus for image processing shown according to an example.

FIG. 4 is a block diagram of an apparatus 1200 for image processing shown according to an example. For example, the apparatus 1200 may be a mobile phone, a computer, a digital broadcasting terminal, a message sending and receiving device, e.g., a game console, a tablet device, a medical device, a fitness device, a personal digital assistant or the like.

Referring to FIG. 4, the apparatus 1200 may include one or more of the following components: a processing component 1202, a memory 1204, an electrical component 1206, a multimedia component 1208, an audio component 1210, an input/output (I/O) interface 1212, a sensor component 1214 and a communication component 1216.

The processing component 1202 generally controls overall operations of the apparatus 1200, such as operations associated with display, telephone calls, data communication, camera operations and recording operations. The processing component 1202 may include one or more processors 1220 to execute instructions to perform all or part of the steps of the above method. In addition, the processing component 1202 may include one or more modules to facilitate the interaction between the processing component 1202 and other components. For example, the processing component 1202 may include a multimedia module to facilitate the interaction between the multimedia component 1208 and the processing component 1202.

The memory 1204 is configured to store various types of data to support operations in the apparatus 1200. Examples of these data include instructions for performing any application or method operating on the apparatus 1200, contact data, phone book data, messages, pictures, videos and the like. The memory 1204 may be implemented by any type of volatile or non-volatile storage device or a combination of them, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The electrical component 1206 provides electric power to various components of the apparatus 1200. The electrical component 1206 may include a power supply management system, one or more power supplies, and other components associated with generation, management and distribution of power for the apparatus 1200.

The multimedia component 1208 includes a screen that provides an output interface between the apparatus 1200 and the user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touch, slide and gestures on the touch panel. The touch sensor may sense the boundary of a touch or slide operation, and also detect the duration and pressure related to the touch or slide operation. In some examples, the multimedia component 1208 includes a front camera and/or a rear camera. When the apparatus 1200 is in an operation mode, such as a shooting mode or a video mode, the front camera and/or the rear camera can receive external multimedia data. Each of the front camera and the rear camera may be a fixed optical lens system or have focal length and optical zoom capabilities.

The audio component 1210 is configured to output and/or input audio signals. For example, the audio component 1210 includes a microphone (MIC). When the apparatus 1200 is in an operation mode, such as a call mode, a recording mode or a voice recognition mode, the microphone is configured to receive an external audio signal. The received audio signal may be further stored in the memory 1204 or transmitted via the communication component 1216. In some examples, the audio component 1210 further includes a speaker for outputting audio signals.

The I/O interface 1212 provides an interface between the processing component 1202 and a peripheral interface module. The above peripheral interface module may be a keyboard, a click wheel, buttons or the like. These buttons may include, but are not limited to: a home button, a volume button, a start button and a lock button.

The sensor component 1214 includes one or more sensors for providing various aspects of state evaluation to the apparatus 1200. For example, the sensor component 1214 may detect an on/off state of the apparatus 1200 or relative positioning of the components. For example, the components are a display and a keypad of the apparatus 1200. The sensor component 1214 may also detect a position change of the apparatus 1200 or a component of the apparatus 1200, a presence or absence of contact between a user and the apparatus 1200, an orientation or acceleration/deceleration of the apparatus 1200, and a temperature change of the apparatus 1200. The sensor component 1214 may include a proximity sensor configured to detect a presence of nearby objects when there is no physical contact. The sensor component 1214 may further include a light sensor, such as a CMOS or CCD image sensor, for use in imaging applications. In some examples, the sensor component 1214 may further include an acceleration sensor, a gyroscope sensor, a magnetic sensor, a pressure sensor or a temperature sensor.

The communication component 1216 is configured to facilitate wired or wireless communication between the apparatus 1200 and other devices. The apparatus 1200 may access a wireless network based on a communication standard, such as WiFi, 4G or 5G, or a combination of them. In an example, the communication component 1216 receives a broadcast signal from an external broadcast management system or broadcasts related information via a broadcast channel. In an example, the communication component 1216 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an example, the apparatus 1200 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic elements, and is used to execute the above method.

In an example, further provided is a non-transitory computer-readable storage medium including instructions, for example, a memory 1204 including instructions. The above instructions may be executed by the processor 1220 of the apparatus 1200 to carry out the above method. For example, the non-transitory computer-readable storage medium may be an ROM, a random access memory (RAM), a CD-ROM, a magnetic tape, a floppy disk, an optical data storage device or the like.

Provided is a non-transitory computer-readable storage medium. When instructions in the storage medium are executed by a processor of an image processing apparatus, the image processing apparatus is capable of executing an image processing method. The method includes:

converting an original image represented by a first color space into the original image represented by a second color space, where a correlation between color components of respective channels in the second color space of the original image is smaller than a correlation between color components of respective channels in the first color space;

denoising channel images formed by the color components of the respective channels in the second color space respectively to obtain denoised images corresponding to the respective channel images; and obtaining a target image based on the denoised images.

Figure 5:
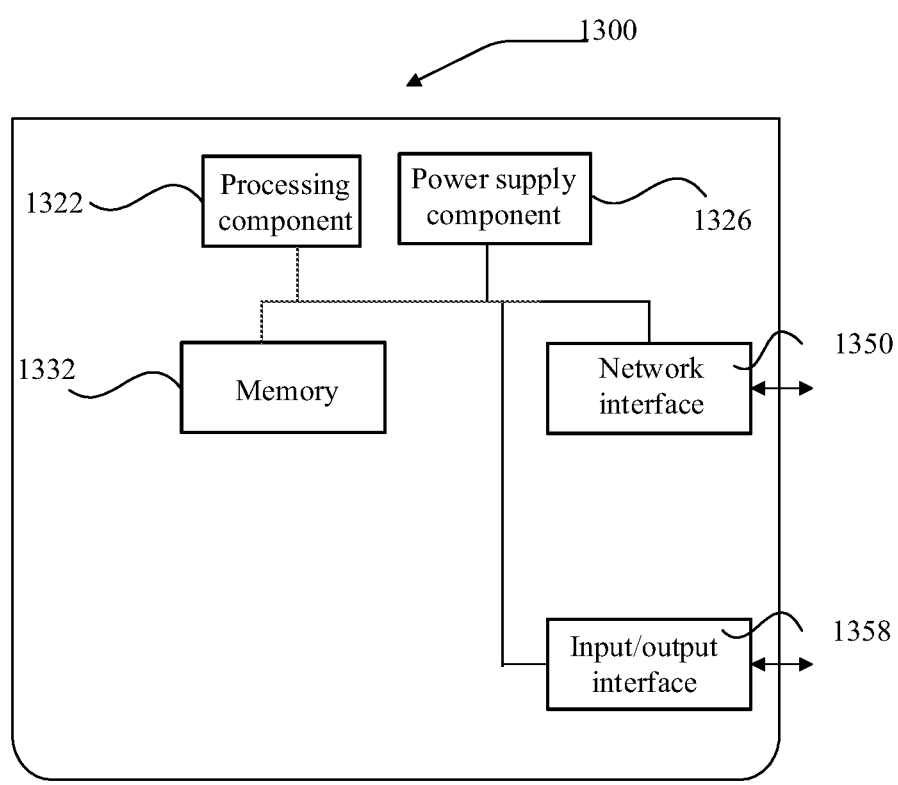
FIG. 5 is a block diagram of another apparatus for image processing shown according to an example.

FIG. 5 is a block diagram of another apparatus 1300 for image processing shown according to an example. For example, the apparatus 1300 may be provided as a server. Referring to FIG. 5, the apparatus 1300 includes a processing component 1322 which further includes one or more processors, and a memory resource represented by a memory 1332, for storing instructions executable by the processing component 1322, such as applications. Applications stored in the memory 1332 may include one or more modules each corresponding to a set of instructions. In addition, the processing component 1322 is configured to execute instructions to execute the above image processing method. The method includes:

converting an original image represented by a first color space into the original image represented by a second color space, where a correlation between color components of respective channels in the second color space of the original image is smaller than a correlation between color components of respective channels in the first color space;

denoising channel images formed by the color components of the respective channels in the second color space respectively to obtain denoised images corresponding to the respective channel images; and obtaining a target image based on the denoised images.

The apparatus 1300 may further include a power supply component 1326 configured to execute power supply management of the apparatus 1300, a wired or wireless network interface 1350 configured to connect the apparatus 1300 to the network, and an input/output (I/O) interface 1358. The apparatus 1300 can operate based on an operating system stored in the memory 1332, for example, Windows Server™, Mac OS X™, Unix™, Linux™, FreeBSD™ or the like.

Those skilled in the art will easily think of other implementation solutions within the scope of the disclosure after considering the description and practicing the teachings herein. The present application is intended to cover any variations, uses or adaptive changes of the disclosure. These variations, uses or adaptive changes follow the general principles of the disclosure and include common knowledge or conventional technical means in the technical field that are not disclosed in the disclosure. The description and the examples are to be regarded as exemplary only, and the true scope and spirit of the disclosure is defined by the following claims.

It should be understood that the disclosure is not limited to the precise structure that has been described above and shown in the accompanying drawings, and various modifications and changes can be made without departing from its scope. The scope of the disclosure is only limited by the appended claims.

What is claimed is:

1. An image processing method, comprising:
    converting an original image represented by a first color space into the original image represented by a second color space, wherein a correlation between color components of respective channels in the second color space of the original image is smaller than a correlation between color components of respective channels in the first color space; and
    denoising channel images formed by the color components of the respective channels in the second color space respectively to obtain denoised images corresponding to the respective channel images; and
    obtaining a target image based on the denoised images;
    wherein obtaining the target image based on the denoised images comprises:
    fusing a first channel image of all the channel images and a first denoised image corresponding to the first channel image to obtain a composite image; and
    obtaining the target image based on the composite image and a second denoised image corresponding to a second channel image other than the first channel image.

2. The method according to claim 1, wherein fusing the first channel image of all the channel images and the first denoised image corresponding to the first channel image to obtain the composite image comprises:
    weighting color components corresponding to the first channel image and color components corresponding to the first denoised image based on composition weights to obtain a weighted color component; and
    fusing based on the weighted color component to form the composite image.

3. The method according to claim 2, wherein weighting the color components corresponding to the first channel image and the color components corresponding to the first denoised image based on the composition weights to obtain the weighted color component comprises:
    weighting the color components of the respective channels of the first channel image based on a first composition weight to obtain a first weighted component;

weighting the color components of the respective channels corresponding to the first denoised image based on a second composition weight to obtain a second weighted component; and determining a sum of the first weighted component and the second weighted component as the weighted color component.

4. The method according to claim 1, wherein denoising the channel images formed by the color components of the respective channels in the second color space respectively to obtain the denoised images corresponding to the respective channel images comprises:

converting the channel images from a spatial domain to a spectral domain respectively; and denoising the channel images converted to the spectral domain respectively to obtain the denoised images corresponding to the respective channel images.

5. The method according to claim 4, wherein converting the channel images from the spatial domain to the spectral domain respectively comprises:

carrying out a discrete cosine transform on the channel images respectively to convert the respective channel images from the spatial domain to the spectral domain.

6. The method according to claim 1, wherein the color components corresponding to the first channel image are used to represent luminance of the original image; and the color components corresponding to the second channel image are used to represent color of the original image.

7. An image processing apparatus, comprising:
a processor; and
a memory storing executable instructions of the processor;
wherein the processor:
converts an original image represented by a first color space into the original image represented by a second color space, wherein a correlation between color components of respective channels in the second color space of the original image is smaller than a correlation between color components of respective channels in the first color space;

denoises channel images formed by the color components of the respective channels in the second color space respectively to obtain denoised images corresponding to the respective channel images;

fuses a first channel image in all the channel images and a first denoised image corresponding to the first channel image to obtain a composite image; and obtains a target image based on the composite image and a second denoised image corresponding to a second channel image other than the first channel image.

8. The image processing apparatus according to claim 7, wherein the processor:

weights color components corresponding to the first channel image and color components corresponding to the first denoised image based on composition weights to obtain a weighted color component; and wherein fusing is based on the weighted color component to form the composite image.

9. The image processing apparatus according to claim 8, wherein the processor:

weights the color components of the respective channels of the first channel image based on a first composition weight to obtain a first weighted component;

weights the color components of the respective channels corresponding to the first denoised image based on a second composition weight to obtain a second weighted component; and determines a sum of the first weighted component and the second weighted component as the weighted color component.

10. The image processing apparatus according to claim 7, wherein the processor:

converts the channel images from a spatial domain to a spectral domain respectively; and denoises the channel images converted to the spectral domain respectively to obtain the denoised images corresponding to the respective channel images.

11. The image processing apparatus according to claim 10, wherein the processor:

carries out a discrete cosine transform on the channel images respectively to convert the respective channel images from the spatial domain to the spectral domain.

12. The image processing apparatus according to claim 7, wherein the color components corresponding to the first channel image are used to represent luminance of the original image; and the color components corresponding to the second channel image are used to represent color of the original image.

13. A non-transitory computer-readable storage medium, wherein when instructions in the storage medium are executed by a processor of an image processing apparatus, the apparatus:

converts an original image represented by a first color space into the original image represented by a second color space, wherein a correlation between color components of respective channels in the second color space of the original image is smaller than a correlation between color components of respective channels in the first color space;

denoises channel images formed by the color components of the respective channels in the second color space respectively to obtain denoised images corresponding to the respective channel images;

fuses a first channel image of all the channel images and a first denoised image corresponding to the first channel image to obtain a composite image; and obtains a target image based on the composite image and a second denoised image corresponding to a second channel image other than the first channel image.

14. The non-transitory computer-readable storage medium according to claim 13, wherein when the instructions are executed by the processor, the apparatus:

weights color components corresponding to the first channel image and color components corresponding to the first denoised image based on composition weights to obtain a weighted color component; and fuses based on the weighted color component to form the composite image.

15. The non-transitory computer-readable storage medium according to claim 14, wherein when the instructions are executed by the processor, the apparatus:

weights the color components of the respective channels of the first channel image based on a first composition weight to obtain a first weighted component;

weights the color components of the respective channels corresponding to the first denoised image based on a second composition weight to obtain a second weighted component; and determines a sum of the first weighted component and the second weighted component as the weighted color component.

16. The non-transitory computer-readable storage medium according to claim 13, wherein when the instructions are executed by the processor, the apparatus:
converts the channel images from a spatial domain to a spectral domain respectively; and
denoises the channel images converted to the spectral domain respectively to obtain the denoised images corresponding to the respective channel images.

17. The non-transitory computer-readable storage medium according to claim 16, wherein when the instructions are executed by the processor, the apparatus:
carries out a discrete cosine transform on the channel images respectively to convert the respective channel images from the spatial domain to the spectral domain.

* * * * *